UNITED STATES PATENT OFFICE.

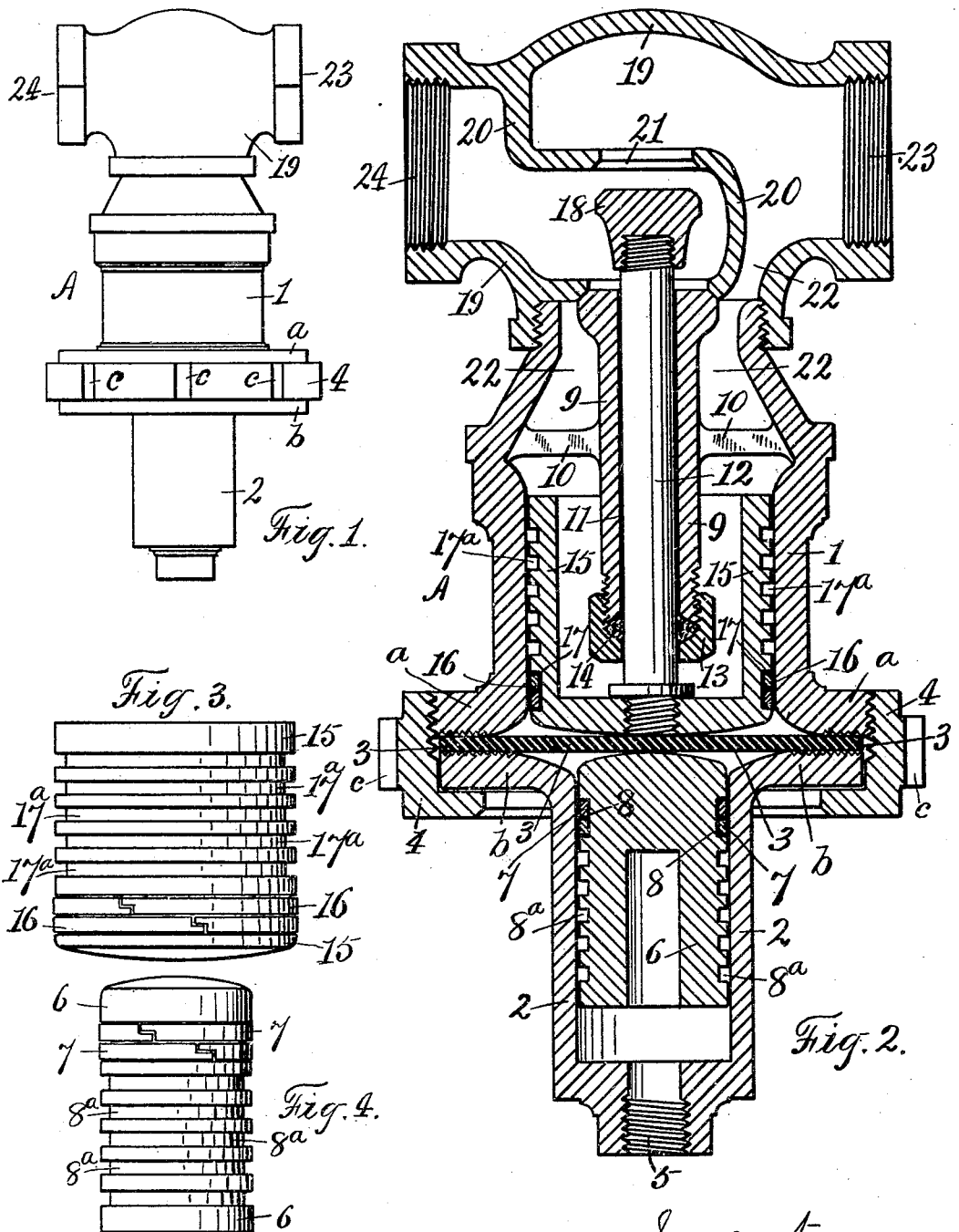

WALTER H. BICE, OF MAPLE LODGE, ONTARIO, CANADA, ASSIGNOR OF ONE-HALF TO ALFRED WESTMAN AND ONE-SIXTH TO WILLIAM R. COLBY, OF LONDON, CANADA.

PUMP-GOVERNOR.

962,736.  Specification of Letters Patent.  Patented June 28, 1910.

Application filed June 18, 1909. Serial No. 503,022.

*To all whom it may concern:*

Be it known that I, WALTER H. BICE, a subject of the King of Great Britain, and a resident of Maple Lodge, in the county of Middlesex, in the Province of Ontario, Canada, have invented a new and useful Pump-Governor, of which the following is a specification.

This invention relates to a governor located on the steam pipe between the pump and the boiler and has a connection with the discharge pipe, which is operated by the pressure of the steam in the steam pipe and the pressure of the water in the discharge pipe. And it consists of the improved construction and novel combination of parts of the same as will be hereinafter first fully set forth and described and then pointed out in the claims, reference being had to the accompanying drawings forming part of this specification wherein;—

Figure 1 is a side view of a pump governor embodying my invention. Fig. 2 is an enlarged detail sectional view of same. Figs. 3 and 4 are side views of the upper and lower pressure plungers, respectively.

In the accompanying drawings the letter, A, indicates the pump governor comprising the hollow bodies 1 and 2, provided with the flanges *a*, and *b*, respectively, between which is located the diaphragm 3 formed of rubber or other pliable material. And the flanges *a*, and *b*, of said hollow bodies are connected and held securely together by the coupling 4, and are readily disconnected by engaging a hook wrench with notches, *c*, in said coupling 4. The lower end of said hollow body 2 is provided with a screw threaded opening 5 as shown in Fig. 2. And fitted to this hollow body 2 is a plunger 6, and the latter is provided with expansion rings 7 in grooves 8, and with grooves 8ª for the purpose which will be hereinafter set forth. The hollow body 1 is provided with an interior sleeve 9 held therein by the bridge arms 10, in which sleeve 9 the opening 11 is formed, to receive a spindle 12.

13 is a packing nut which engages with the screw threaded end of the sleeve 9, and 14 is a packing which said nut binds against said sleeve 9 and said spindle 12. The spindle 12 engages with the plunger 15 which is fitted to the inside of the body 1, and said plunger 15 is provided with expansion rings 16 which are fitted to grooves or recesses 17 in said plunger 15 between the latter and the body 1, and said plunger 15 is also provided with the grooves 17ª for the purpose which will be hereinafter set forth.

18 is a valve threaded on the upper end of the spindle 12.

19 is a valve body provided with a partition 20 in which is a valve seat 21, and this valve body 19 is threaded on the upper end of the body 1, until the lower portion of the valve body 19 which is fitted to the sleeve 9 is tightened thereon.

22 is an opening through the valve body 19 and past the partition 20 into the body 1 and plunger 15.

The operation is as follows:—The steam is piped to the inlet end 23 of the valve, it then passes through the valve body 19 and the valve seat 21, in the partition 20. It then passes out of the valve body 19 through the outlet 24 to the pump, and operates the latter to pump the water into the boiler. The pressure of the steam in the valve body 19 carries it down through the opening 22 and into the plunger 15 located above the pliable diaphragm 3, and the pressure of this steam on this plunger 15 lowers the latter as well as said pliable diaphragm 3, and this plunger 15 being connected to the spindle 12, on the top of which the valve 18 is located, lowers the latter from the seat 21, and this permits the steam to pass through the valve body 19 to the pump, where it operates the latter for the purpose hereinbefore described. The screw threaded opening 5 of the pump governor, A, is connected to the discharge pipe not shown, that leads from the pump to the boiler, and between this pump governor, A, connection and the boiler there is a regulator on this discharge pipe, not shown. When the water in the boiler is at the proper or desired height, it (the water) automatically closes the regulator not shown, then by the constant action of the pump increases the pressure in the discharge pipe, thus acting back on the pump governor, A, through the screw threaded opening 5 which pressure on the lower plunger 6, overpowers the pressure on the upper plunger 15, and causes the lower plunger 6 to raise the pliable diaphragm 3, which raises the upper plunger 15, spindle 12 and valve 18 to close the latter on the seat 21; thus reducing or cutting off the steam supply to the pump, which reduces the motion of the pump to that required to supply water according to evaporation. The purpose of the grooves 17ª and 8ª is to receive the condensed steam to form a water packing between the plungers 15 and 6 and hollow bodies 1 and 2 in order to relieve these plungers from friction. A pump governor in which plungers are formed with these grooves, forms a simple, inexpensive and efficient device for the purpose intended, at the same time it is less complicated and less liable to get out of repair.

Having thus described my invention, I claim:

1. A pump governor comprising an upper hollow body, a lower hollow body, a flexible diaphragm interposed between said bodies, means for coupling said bodies together whereby the diaphragm is maintained in position, said lower hollow body adapted to communicate with a discharge pipe, a hollow plunger in said lower body, a sleeve extending in the direction of the length of and secured to said upper hollow body within the same, a hollow plunger arranged within said upper hollow body, a spindle extending through said sleeve and having one end connected to said plunger in the upper hollow body, a valve secured to the other end of said spindle, and a valve body mounted upon said upper hollow body and communicating therewith, and provided with a valve seat adapted to be engaged by said valve.

2. A pump governor comprising a valve body having an inlet and an outlet, and further provided with a partition having a valve seat, an upper and a lower hollow body superposed with respect to each other, a flexible diaphragm interposed between said hollow bodies, means for securing the hollow bodies together whereby said diaphragm is maintained in position, said valve body mounted upon said upper hollow body and communicating therewith, an inverted hollow plunger arranged in the lower hollow body and below the diaphragm, said lower hollow body adapted to communicate with the discharge pipe, a cup-shaped plunger mounted in said upper hollow body and above the diaphragm, a spindle arranged within said upper hollow body and having its lower end connected to said cup-shaped plunger, and a valve carried by the other end of said spindle and adapted to engage said valve seat for shutting off the inlet from the outlet of the valve body.

3. A pump governor comprising a valve body having an inlet and an outlet, and further provided with a partition having a valve seat, an upper and a lower hollow body superposed with respect to each other, a flexible diaphragm interposed between said hollow bodies, means for securing the hollow bodies together whereby said diaphragm is maintained in position, said valve body mounted upon said upper hollow body and communicating therewith, an inverted hollow plunger arranged in the lower hollow body and below the diaphragm, said lower hollow body adapted to communicate with the discharge pipe, a cup-shaped plunger mounted in said upper hollow body and above the diaphragm, a spindle arranged within said upper hollow body and having its lower end connected to said cup-shaped plunger, and a valve carried by the other end of said spindle and adapted to engage said valve seat for shutting off the inlet from the outlet of the valve body, each of said plungers provided with peripheral grooves, packing rings mounted in certain of the grooves of each plunger, the remaining of said grooves being clear to constitute fluid packing spaces.

In testimony whereof, I have signed in the presence of the two undersigned witnesses.

WALTER H. BICE.

Witnesses:
P. J. EDMUNDS,
P. PREBBLE.